Dec. 12, 1939.   D. A. BOYD   2,183,005
SEAL
Filed Oct. 29, 1937
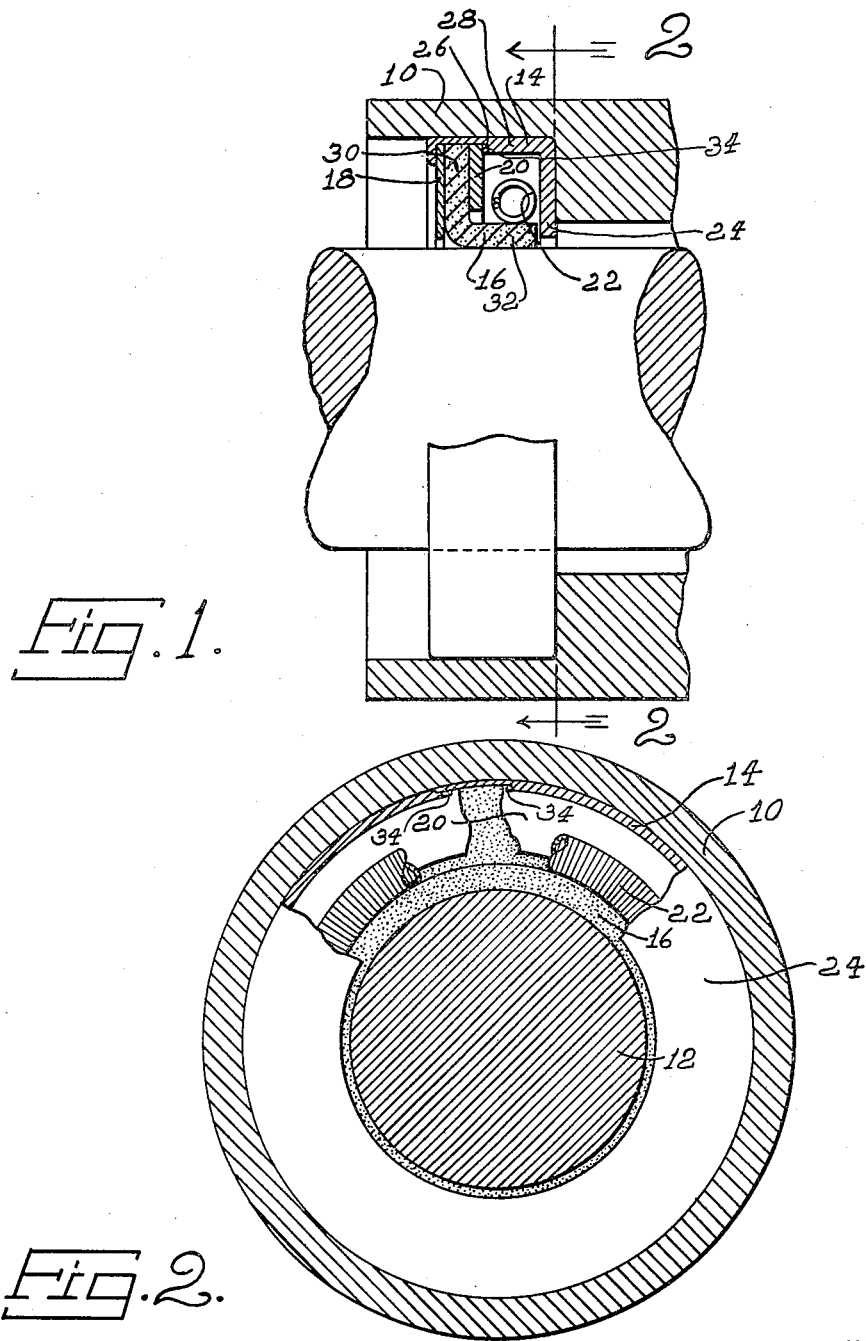
INVENTOR
DONALD A. BOYD
BY
ATTORNEY Patented Dec. 12, 1939

2,183,005

UNITED STATES PATENT OFFICE 2,183,005

SEAL

Donald A. Boyd, Detroit, Mich.

Application October 29, 1937, Serial No. 171,721

2 Claims. (Cl. 288—3)

This invention relates to a packing and more particularly to a packing member which may be inserted as a unit in a housing surrounding a centrally located shaft.

An object of the invention is to provide an inexpensive structure which may be assembled with a minimum number of parts, and to provide means for sealing the packing member with the outer periphery of the cage member.

Other objects and advantages of the invention will be more apparent from the following description taken in connection with the accompanying drawing, in which:

Fig. 1 is a longitudinal sectional view through a housing illustrating the improved seal in encompassing relation with a shaft, the latter being shown in elevation and the seal and housing in section.

Fig. 2 is a sectional view of the seal taken on the line 2—2 of Fig. 1.

Referring to the drawing, and particularly to Fig. 1, the improved seal is adapted to be inserted in a housing 10 in encompassing relation to a centrally located shaft 12. The seal consists of an annular metallic retainer 14, a substantially L-shaped packing member 16, an annular metallic flat washer 18, a similar washer 20, the washers 18 and 20 being disposed on opposite sides of the radially extending flange of the packing member 16, and a coil spring 22.

The retainer 14 is formed cup-shaped, having an opening in an end wall 24 for the reception of the shaft 12, and a shoulder 26 on the inner periphery of the axially extending wall 28. The shoulder 26 is formed either by rolling the end of the flange 28 to a thinner section or by machining away the outer edge portion of the inner periphery of the flange 28.

The packing member 16 has its radially extending flange 30 between the washers 18 and 20, and its axially extending flange 32 is adapted for pressure engagement, induced by the spring 22, on the shaft 12.

In assembling the seal, an annular packing member 34, such as a paper washer or the like, of substantially the thickness of the shoulder 26, is positioned against the latter, and the washer 20 is then placed against the packing 34. The radially extending flange 30 of the packing 16 is positioned against the washer 20 and the washer 18 is then placed against the outer surface of the radially extending flange 30. The outer edge of the axially extending flange 28 of the cup member 14 is then bent radially inwardly pressing the three parts, washer 16, flange 30 and washer 18, into tight engagement against the shoulder 26 and packing 34.

Various changes, including the size, shape and arrangement of parts, may be made without departing from the spirit of the invention and it is not my intention to limit the scope of the same other than by the terms of the appended claims.

What I claim is:

1. A self-contained seal comprising a stamped sheet metal cup having an outer peripheral flange extending axially and an integral radially extending flange terminating to form a central aperture in the bottom wall of said cup, said axially extending flange having the outer portion of its wall reduced in thickness to provide an outwardly facing shoulder on the inner periphery of said axially extending flange, a sealing member against said shoulder, a washer against said sealing member, a packing member against said washer, another washer against said packing, and a radially extending flange at the free edge of said axially extending flange against said last named washer.

2. A self-contained seal comprising a sheet metal cup having an outer peripheral flange extending axially and an integral radially extending flange terminating to form a central aperture in the bottom wall of said cup, said axially extending flange having the outer portion of its wall reduced in thickness to provide an outwardly facing shoulder on the inner periphery of said axially extending flange, packing means secured in said reduced end portion in sealing engagement with said shoulder, and a radially extending washer abutting the outer surface of said packing, said reduced outer portion of said axially extending flange being turned inwardly against the outer edge of said washer.

DONALD A. BOYD.